United States Patent [19]
Elliott

[11] Patent Number: 4,690,296
[45] Date of Patent: Sep. 1, 1987

[54] OPEN FLOW VALVE ASSEMBLY

[75] Inventor: Gregory K. Elliott, Tustin, Calif.

[73] Assignee: Kaiser Aerospace & Electronics Corporation, Oakland, Calif.

[21] Appl. No.: 919,596

[22] Filed: Oct. 17, 1986

Related U.S. Application Data

[63] Continuation of Ser. No. 805,588, Dec. 9, 1985, abandoned, which is a continuation of Ser. No. 633,659, Jul. 23, 1984, abandoned.

[51] Int. Cl.[4] ............................................. B65D 43/16
[52] U.S. Cl. ..................................... 220/259; 220/256; 251/299
[58] Field of Search ................. 292/210, 216, 219; 220/244, 256, 259, 314, 318; 137/383, 800; 29/157.1 R, 156.7 R, 156.7 A; 251/95, 99, 114–116, 298, 299

[56] References Cited

U.S. PATENT DOCUMENTS

| | | | |
|---|---|---|---|
| 695,046 | 3/1902 | Granton | 251/298 |
| 1,710,585 | 4/1929 | Matthiessen et al. | 251/298 |
| 1,737,123 | 11/1929 | Page | 251/299 |
| 3,039,482 | 6/1962 | Goldberg | 251/298 |
| 3,316,003 | 4/1967 | Russell et al. | 292/219 |
| 3,719,380 | 3/1973 | Watermann | 292/216 |
| 4,098,427 | 7/1978 | Duckworth | 220/259 |
| 4,127,215 | 11/1978 | Morrison | 220/259 |

*Primary Examiner*—Samuel Scott
*Assistant Examiner*—Noah Kamen
*Attorney, Agent, or Firm*—Marvin H. Kleinberg

[57] ABSTRACT

A non obstructing, flap type valve for a circular conduit is defined as a right angle section from a cylinder wall of the same diameter. A mating, right angle section taken from the end of the circular conduit defines the valve seat. The valve is end mounted and pivots from a closed sealing configuration to an open, free flow position. A flattened rod cooperates with a cam surface to lock the valve in the closed position, or a bias spring may maintain the valve closed.

9 Claims, 8 Drawing Figures

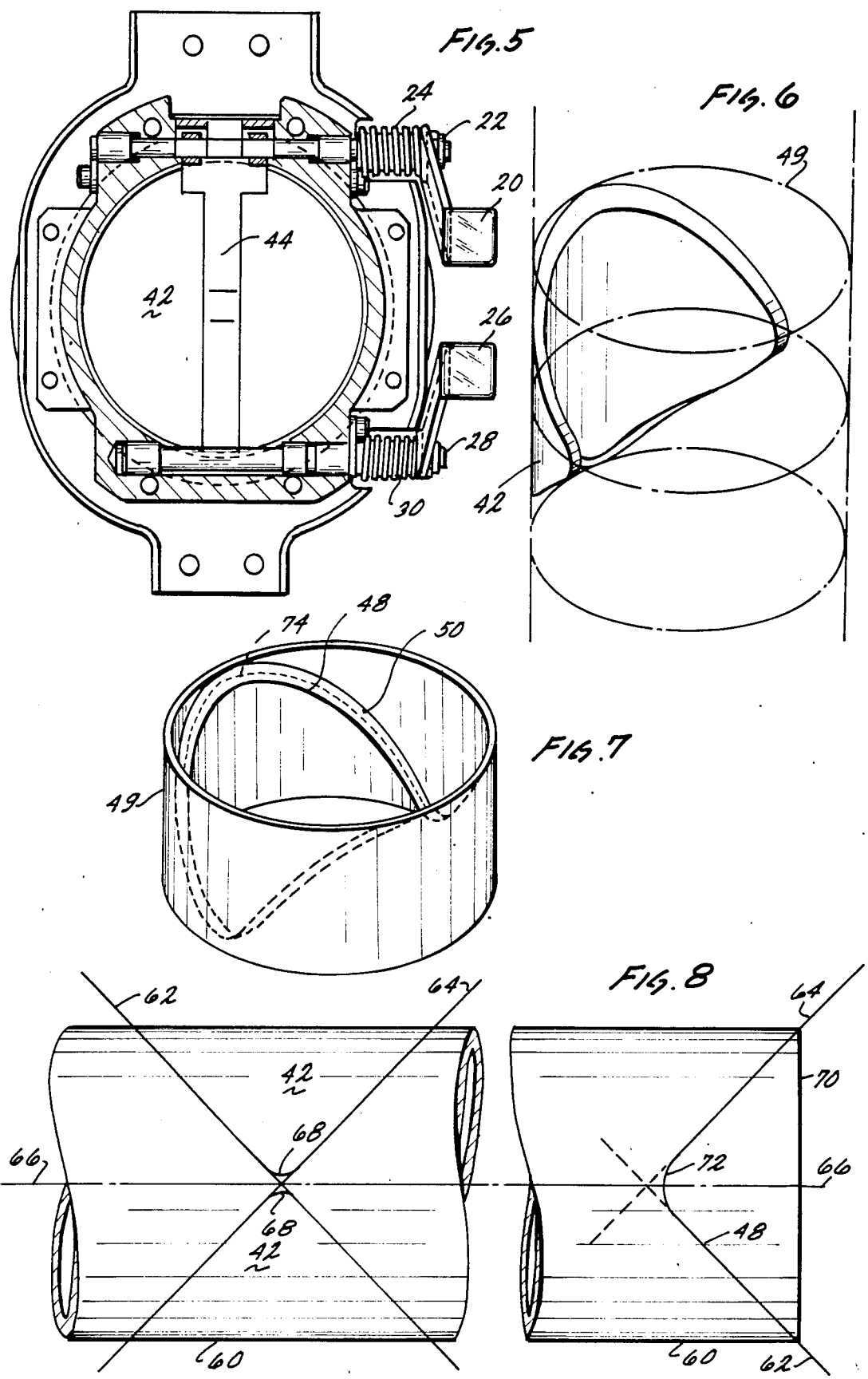

OPEN FLOW VALVE ASSEMBLY

This is a continuation of co-pending application Ser. No. 805,588 filed on Dec. 9, 1985, now abandoned, which is a continuation of Ser. No. 633,659, now abandoned, filed June 23, 1984.

BACKGROUND OF INVENTION

The present invention relates to valves, and more particularly, a novel flap type valve configuration that permits free unobstructed flow when opened, similar to a ball valve but without the bulk and complex mechanism generally associated with such a valve.

FIELD OF THE INVENTION

The valve of the present invention is useful in most fluid distribution systems. It is understood that the term "fluid" encompasses both liquid and gaseous systems and includes vacuum systems, as well. It is believed that the present invention has utility in most fluid handling systems except those which are operated at relatively high pressures.

Such valves could replace check valves in pipelines and could include biasing elements to maintain the valve in closed configurations. Such a valve could then pass traveling probes or tools that may be substantially the diameter of the pipe line. Alternatively, the valve could be opened by a probe.

One area of use for which a particular embodiment has been configured, is in aircraft lavatory waste drain systems where a valve is needed at the waste system service panel of an aircraft, accessible to ground maintenance personnel. Other embodiments of the invention can be utilized as an in line valve useful in fuel handling, water management, air management, and air ducting systems. The invention should be considered in the light of all such other areas of use.

In prior art aircraft lavatory waste management systems, the service panel included an access port covering device of the type described and shown in the patent to Morrison, U.S. Pat. No. 4,127,215, assigned to assignee of the present invention. The Morrison device was designed to work with a rubber plug in the waste drain at the service panel which sealed the outlet drain against leakage from the tank drain valve. Typical plugs and mechanisms for operating with them are shown in the patents to Krause et. al, U.S. Pat. No. 4,086,670, Morrison U.S. Pat. No. 4,188,675, supra, and Zieg U.S. Pat. No. 4,338,689 all assigned to assignee of the present invention. These forms of occluding the waste drainpipe require a special mechanism that withdraws the plug to permit the waste to drain into an appropriate waste removal system, such as was disclosed in the patent to Lynch, U.S. Pat. No. 3,010,694.

A problem is encountered if the drain valve opening at the tank becomes occluded by waste matter, preventing the waste tank drain valve from sealing properly. Similarly, there is the danger that waste materials may collect at the service panel, thereby preventing the rubber plug from making a perfect seal. In either event, there is the danger of leakage which, if unchecked, could, during aircraft flight, result in the accumulation of frozen wastes, which can break off and fall to the ground, posing a danger to persons and property. The frozen effluent also represents potential damage to aircraft flight control surfaces.

It is has been deemed essential that the drain plug be in place and sealed before the aircraft can be cleared for flight. A system to prevent closure of the service panel in the absence of such a plug has been disclosed and claimed in the patents to Morrison U.S. Pat. No. 4,127,715, and Krause et al, U.S. Pat. No. 4,086,679, both assigned to the assignee of the present invention. It is, of course, possible to defeat even the most sophisticated interlock system through the application of "brute" force.

SUMMARY OF THE INVENTION

It would be desirable to have a flap type valve that provides substantially no obstruction to fluids or objects passing through a pipe line system, yet which does not require a bulky housing either inside or outside of the pipe line. Such a valve would be most useful, for example, in aircraft lavatory waste systems where it would be desirable to have a waste drain closure which does not require an elaborate system to operate and which can remain attached to the aircraft. Further, the closure should not occlude the flow when opened. Such a closure should be light and not require much space beyond the space required by the waste drain, itself. The operating controls of such a closure should be sufficiently small and simple to be accommodated in the limited area provided at the service panel of commercial aircraft.

According to the present invention, a unique flap type valve element is created from a section of a cylinder of the same diameter as the waste drain and providing, in the end of the drain, a valve seat into which the unique valve element can fit. An external valve operating lever at one edge of the valve rotates the valve through 90 degrees to provide a non obstructing flow path. At the opposite edge of the valve element, a cylindrical locking rod, having a flat surface, is also operated by a locking lever. The valve operating lever is used to close the valve element initially and the locking lever rotates the cylindrical shaft to bear on a cam surface.

To effect a positive seal, an access port hatch is provided with a central, plunger mechanism which bears against the valve element, forcing it against the seal. The access port cover is latched through an over-center mechanism, which further depresses the valve element. The locking lever automatically follows to hold the valve at its most compressed point.

When it is necessary to service the waste tank, the access port is opened and a drain hose assembly is coupled to a drain outlet. The locking lever is then rotated which releases the valve. The valve operating lever then rotates the valve to its full open position. The waste tank drain valve can then be opened to permit the effluent to flow from the aircraft.

When the waste tank has been completely serviced, the valve is manually closed using the operating lever. The locking lever is rotated to hold the valve in place. The drain hose can then be uncoupled and the access port hatch secured. As noted above, an over-center lever is used to maintain the hatch securely locked. An extra, inward motion is transmitted to the valve by the plunger, causing the locking cam to follow, securing the valve at its most compressed point. The service panel is then closed and the aircraft is then ready to return to service.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 5 is a top view of the valve assembly of the present invention;

FIG. 6 is a perspective view of a section of a cylinder showing the generation of the valve element of the present invention therefrom;

FIG. 7 is a perspective view of the end portion of a cylinder, illustrating a valve seat for the valve of FIG. 6; and FIG. 8 is an idealized view of a cylinder with intersecting orthogonal planes defining the valve element and valve seat of the present invention.

DESCRIPTION OF THE PREFERRED EMBODIMENT

Figure 1:
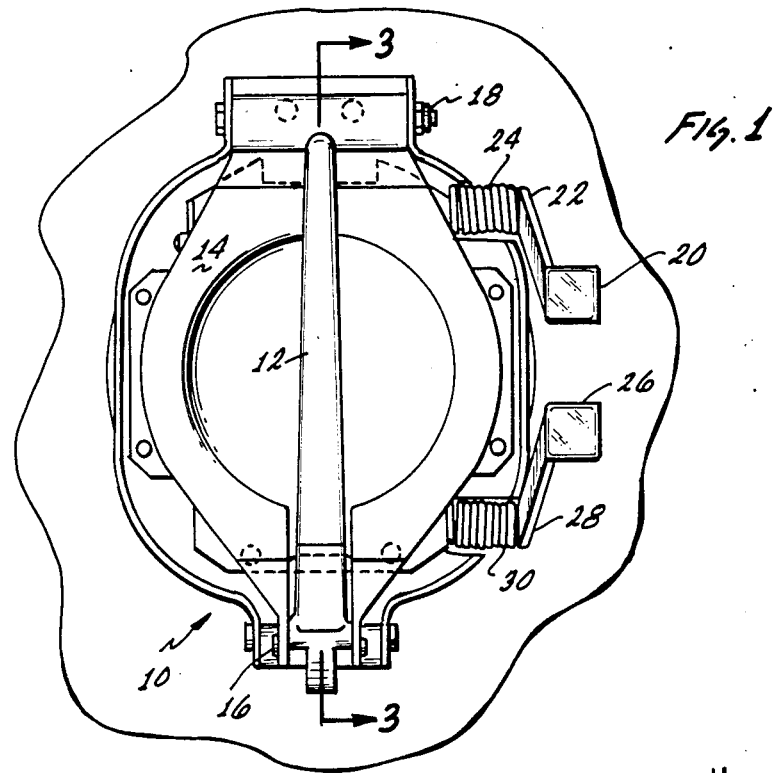
FIG. 1 is a top view of an externally operated lavatory drain assembly for aircraft employing the valve of the present invention.

Turning first to FIGS. 1-5, there is shown a complete lavatory waste drain servicing assembly 10 which includes the improved valve of the present invention. FIG. 1 illustrates what would be seen at the service panel of an aircraft by a service technician about to drain the lavatory waste tank. From this vantage point, there is seen first a latching lever 12 which secures the access port cover 14 that conceals and protects the valve of the present invention. The latching lever 12 is pivotally mounted on a pin 16 and the access port cover is pivotally mounted on a pin 18. If either the lever 12 or the port cover 14 is open, a service panel hatch on the aircraft (not shown) will not close and the aircraft will not be flight ready.

A spring loaded actuating lever 20 is connected to the valve of the present invention through a rotatable pin 22 which is firmly fastened to an end of the valve of the present invention. A first spring 24 tends to keep the valve open.

A locking lever 26 is connected to a second cylindrical locking rod 28 having a surface flat 29 that locks the valve, in a manner to be explained in greater detail in connection with FIGS. 3 through 5 below. A locking bias spring 30 tends to hold the locking lever 26 in the locked position so that any forces directly applied to the valve would allow the locking rod 28, under the influence of the bias spring 30 to follow the valve and hold it in its tightest position.

Figure 2:
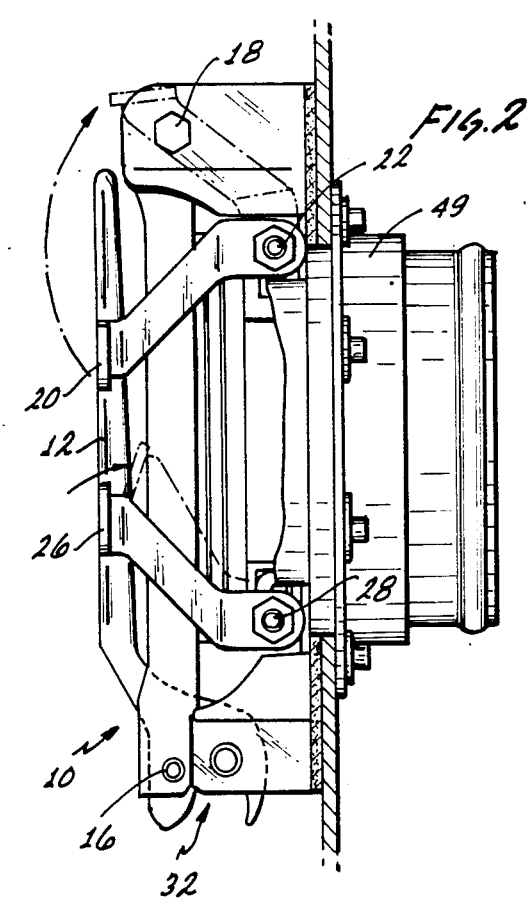
FIG. 2 is a side view of the assembly of FIG. 1.

In FIG. 2, the assembly of FIG. 1 is seen from the side. FIG. 2 also shows the over-center lock portion 32 of the latching lever 12, which initially seats the access port cover 14 before releasing it slightly, as the lever 12 reaches its fully closed position. As seen in FIG. 2, the valve actuating lever 20 opens the valve when rotated in the clockwise direction. Similarly, the locking lever 26 releases the valve when pushed and rotated in the clockwise direction.

Figure 3:
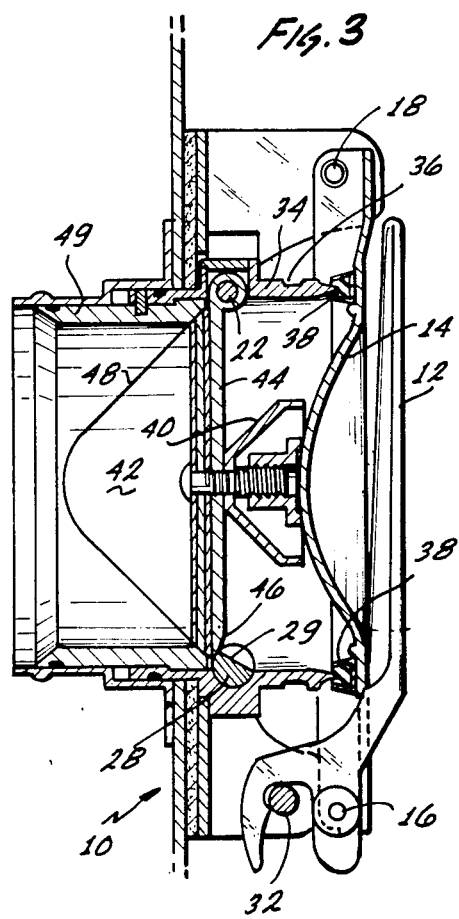
FIG. 3 is a side section view of the assembly of FIG. 1 taken along a line 3—3 in the direction of the appended arrows.

In FIG. 3, there is shown in greater detail the lock portion 32 of the latching lever 12. There is also shown, in cross-section view, the locking rod 28 which holds the valve of the instant invention in its closed position, and whose operation will be explained below.

The waste drain for the aircraft includes a tubular extension or nipple 34, having seating grooves 36 adapted to receive a quick connect coupler, that would be part of a draining and flushing system. The outer end of the nipple 34 is seated in a seal 38 that is carried on the inner surface of the access port cover 14.

Mounted to the interior of the access port cover 14 is a plunger assembly 40, that is adapted to bear against a valve element 42 of the present invention to maintain it in a fully closed position as a "back up" to the locking rod 28. The valve element 42 includes an actuating or support bar 44 which is connected to the rotatable valve actuating pin 22. At the opposite end of the actuating bar 44 there is a cam surface 46, which cooperates with the locking pin 28 to seal the valve element 42 after it is seated.

A valve seat 48 is formed in the end of the cylindrical conduit 49 that connects to the waste tank (not shown) and, as can be seen from FIG. 3, the fit can be as precise as is necessary. The valve seat 48 can be fitted with an O-ring 50 so that the opposing surfaces do not have a metal-to-metal contact.

Figure 4:
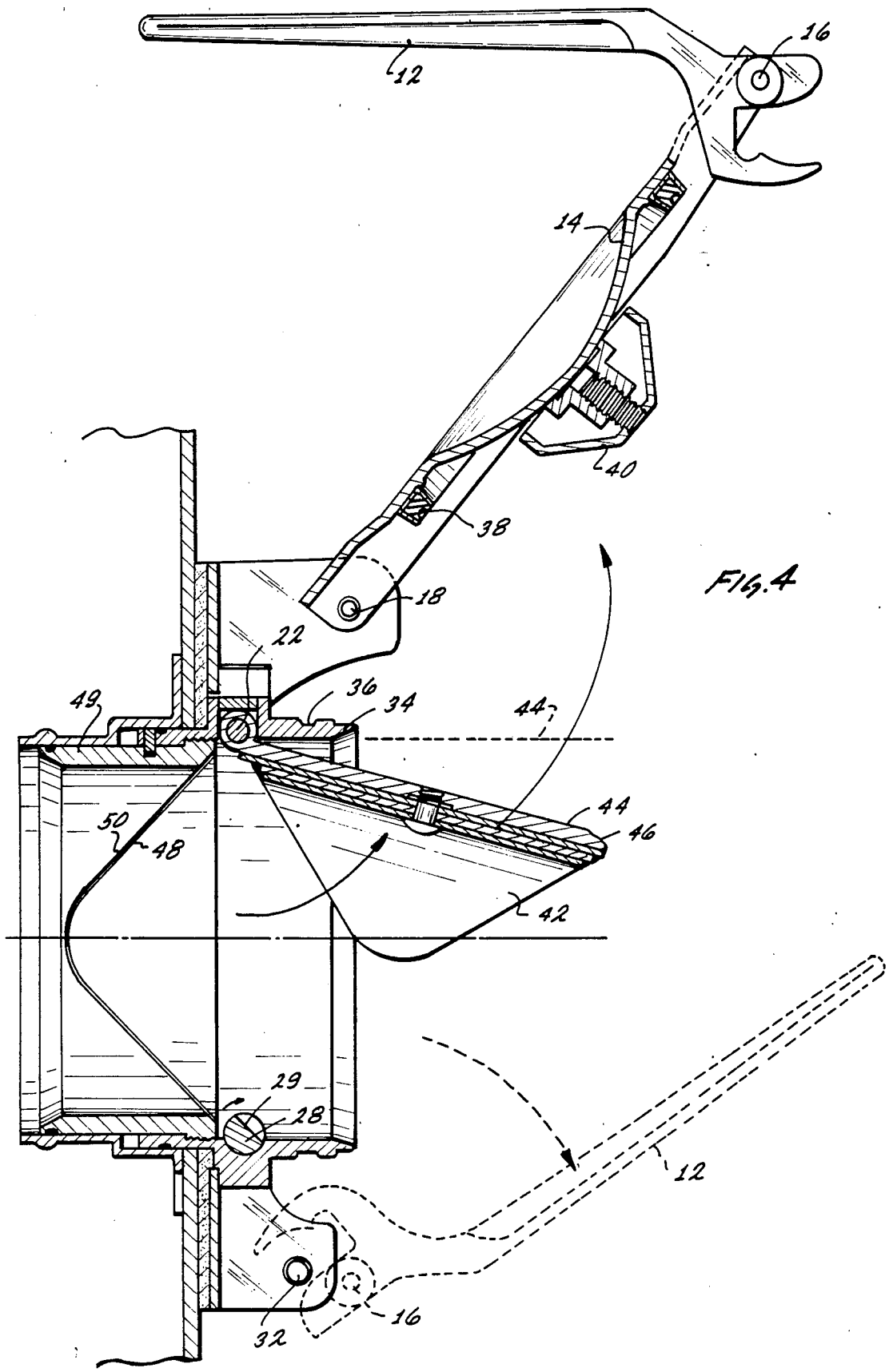
FIG. 4 is a side section view of the assembly of FIG. 3 shown in the open configuration.

Turning to FIG. 4, there is shown the flap type valve element 42 in its open configuration. The latching lever 12 is shown fully opened as is the access port cover 14. The valve element 42 is open and the actuating bar 44 (as shown in the dashed lines) is substantially in line with the inner surface of the nipple 34. In the open configuration, the valve element 42 forms a section of a cylinder that is coaxial with the cylindrical nipple 34, and has no surfaces intruding into the interior volume of the conduit 49. The locking rod 28 has rotated to be self latching when the valve element 42 closes.

FIG. 5 is a top view of the valve element 42 in the closed configuration. As seen in FIG. 5, the valve element 42 completely occupies the orifice of the conduit 49 and is a section of a cylinder whose axis runs from "top" to "bottom" as viewed in FIG. 5. The valve locking mechanism can be understood by reference to FIGS. 3-5. It will be seen that the cylindrical rod 28 has a flat surface 29 on a chord of its cylindrical cross-section.

When the rod 28 is rotated so that the flat surface 29 is in the horizontal, as viewed in FIGS. 3 and 4, the end of the actuating bar 44 will clear the rod 28 completely.

When closing the valve element 42, the actuating bar 44 will engage the flat surface 29 and will cause the rod 28 to rotate the counter-clockwise direction (as viewed in Fig. 3) until it is past the rod 28. Under the influence of the spring 30, the rod 28 rotates, trapping the support or actuating bar 44 under the cylindrical portion of rod 28. The cam surface 46 permits the rod 28 to rotate further as the valve element 42 is further depressed, such as by operation of the plunger 40 when the access port cover 14 is locked into place by the latching lever 12 engaging the locking portion 32. As seen in FIG. 3, the plunger 40 engages the actuating bar 44 and closes the valve 42 more tightly, fully compressing the O-ring 50 in the valve seat 48.

Turning next to FIGS. 6, 7, and 8, there are shown in perspective view, the valve member 42 and valve seat 48 of the present invention. As can be seen from FIG. 8, the valve seat 48 is formed in the end of cylindrical waste line 49, while valve member 42 is formed from one side of an identical cylindrical member 60. Both the valve member 42 and the seat 48 are generated by two planes 62, 64, that intersect at 90 degrees, with the line representing the intersection of the planes, passing through and orthogonal to the axis 66 of the respective cylinder.

To simplify the fabrication, and make for an easier fitting seal, the valve member is radiused at the intersection of the planes 62, 64, to form a curved surface 68. The edges are chamfered so that the valve member and valve seat meet along an angle.

Similarly, the valve seat 48 is created by passing two planes 62, 64, through the end 70 of the cylinder 49 with the intersection of the planes 62, 64 being orthogonal to the axis 66. For the valve seat 48, the portion that is cut from cylinder 49 is displaced 90 degree relative to that which was cut from cylinder 60 to form valve member 42. The axis 66 is in the plane of the bisector of the angle formed by the planes 62,64. The point of intersection is also radiused into a curve 72 to match the rounded end 68 of valve member or element 42. The inner surfaces are chamfered to complement the chamfer of the valve element 42. In addition, the valve seat 48 has in the chamfered surface, a groove 74, which can hold an O-ring 50. The O-ring 50 serves as an effective seal when the valve element 42 is forced into place.

As seen in FIG. 8, the planes forming the valve seat 48 enter the cylinder 60 from the end 70, while the planes 62, 64 defining the valve 42 enter along the cylinder 49 walls. The valve and valve seat combination create a virtually interference free flow of fluid since the open valve member is an extension of the cylinder wall.

To summarize the operation of the waste drain valve embodiment, a service technician first opens a service panel hatch (not shown) on the aircraft. The latching lever 12 is opened which permits the access port cover 14 to swing open, revealing the waste drain nipple 34. After a suitable waste drain pipe is coupled to the nipple 34, the locking lever 26 is depressed, rotating the rod 28 and releasing the actuating bar 44 that is fastened to the valve element 42. The valve actuating lever 20 is rotated in the clockwise direction to open the valve 42, permitting the contents of the tank to drain. The actuating valve spring 24 retains the valve element 42 in its open configuration, which presents minimum interference to fluid flow, if any.

When the tank is drained and rinsed, the actuating lever 20 is rotated in the counter-clockwise direction, against the bias spring 24. As the cam surface 46 of the actuating bar 44 strikes the rod 28, the flat surface 29 is engaged by the cam surface, rotating the rod 28 against the force of its bias spring 30. The rod 28 rotates until the flat 29 permits the cam surface 46 to clear. The rod 28 then rotates in the counter-clockwise direction, trapping the cam surface 46 underneath the cylindrical portion of the rod 28. At this point the drain hose may be uncoupled from the nipple 34 and can removed. The access port cover 14 is then closed.

As the access port cover 14 closes, the plunger assembly 40 engages the actuating bar 44, further seating the valve element 42. The latching lever 12 engages its locking assembly 32 and, as the lever 12 is brought down to its horizontal or latched position, the access port cover 14 is forced inwardly. The pressure is then relieved and the port cover 14 comes out, slightly. During that phase of the operation, however, the plunger 40 has been bearing against the valve element 42, forcing it into tighter engagement with the valve seat 48. As the valve 42 is further depressed, the rod 28 rotates under the influence of the bias spring 30, holding the cam surface 46 at its point of farthest engagement. When the plunger 40 assembly backs off slightly, the valve element 42 is still held at its point of innermost travel by the rod 28.

The flap type valve 42 element which is a section of the cylinder, seats in a complementary section. The valve has the unique property of providing, when open, an interference-free passage which requires very little increase in diameter of the conduit cylinder and only a slightly axial extension to the cylinder. Whereas other valve systems require a greater overall volume to house the valve and its actuating mechanism, the present invention requires only the external operating levers, which connect to rods or pins that lock and operate the valve.

The innovative valve of the present invention, in the aircraft waste drain system, replaces a plug assembly which requires a complex drain apparatus as part of the ground service equipment. Further, a separable element, which can be and often is misplaced or lost, is no longer required.

While the novel valve of the present invention has been shown in the environment of a lavatory waste drain system, it will be readily understood that such a valve is useful in virtually any fluid delivery system that operates a relatively low pressures. If the system requires that the valve remain clear of the flow path when opened, the valve of the present invention is most useful.

Typical systems that could use such a valve would include heating, ventilating and air conditioning systems and some "soft" vacuum systems, wherein the pressure differential is not so great as to unduly stress the operating mechanism. However, even large pressure differentials could be accomodated if a mechanical cam could bear against one end of the valve sufficient to break the seal of a great pressure differential and permit light flow.

Accordingly, the scope of the invention should be limited only by claims appended hereto.

What is claimed as new is:

1. A valve assembly for sealing an aircraft lavatory drain port and adapted for full opening with no obstruction of flow, comprising:

a cylindrical conduit having an end on which a valve seat is formed;

a valve member made from a hollow cylindrical member having an inner diameter which is the same as the inner diameter of said conduit, said inner valve member being formed from said hollow cylindrical member as a longitudinal portion thereof by cutting said hollow cylindrical member along two intersecting orthogonal planes whose bisector is a plane radial to said hollow cylindrical member;

said valve seat being formed on said conduit along two intersecting orthogonal planes entering said conduit at the circumference thereof and whose bisector is a plane that includes the longitudinal axis of said conduit, the apex of said valve member created by the intersection of its orthogonal planes being cut to a curvature and said valve seat being formed with a mating curvature whereby said inner valve member may be disposed with its longitudinal axis perpendicular to the longitudinal axis of said conduit for engaging said valve seat and thereby closing off said conduit;

an elongated support bar extending longitudinally of said inner valve member along its outer wall and secured thereto, one end of said support bar having a transversely extending hinge pin therein, said hinge pin being disposed radially external to the interior wall surface of one side of said conduit;

a tubular extension secured to the end of said conduit and forming an extension thereof, the inner diameter of said tubular extension being greater than the inner diameter of said conduit, said hinge pin being rotatably supported from said tubular extension such that said valve member may pivot through an angle of ninety degrees between its closed position, and a fully open position in which its interior wall surface is an extension of the interior wall surface of said conduit;

said tubular extension having external seating grooves adapted to receive a quick connect coupler; and locking means carried by said tubular extension cooperating with the other end of said support bar for locking said valve member in its closed position.

2. A valve assembly as in claim 1 wherein said locking means includes a locking rod disposed on the other side of said conduit parallel to said hinge pin and rotatably supported from said tubular extension;

said locking rod having a flat surface on one longitudinal portion such that it may selectively interfere with the pivoting movement of said valve member between closed and open positions, or else it may permit such movement, depending upon the rotational position of said locking rod.

3. Apparatus as in claim 2 which includes a spring associated with said locking rod for normally keeping it in its interfering position.

4. Apparatus as in claim 3 which further includes a locking lever attached to said locking rod for controlling the operation of said rod and said spring.

5. Apparatus in claim 1 wherein said hinge pin has a spring associated therewith which urges said valve member towards its open position, and said locking rod has an associated spring which normally retains said locking rod in its interfering position so as to normally keep said valve member closed.

6. A valve assembly as claimed in claim 1 wherein said hinge pin is fixedly attached to said support bar and is rotatably journalled in the wall of said tubular extension, said hinge pin also extending externally of said tubular extension; and which further includes:

an outer sealing door supported from said turbular extension and adapted for pivoting between an open position and a closed position in which it seals said tubular extension; and a handle attached to the external portion of said hinge pin and operable when a drain hose remains coupled to said tubular extension for selectively closing and valve member.

7. A valve assembly for sealing an aircraft lavatory drain port and adapted for full opening with no obstruction of flow, comprising:

a cylindrical conduit having an end on which a valve seat is formed;

an inner valve member made from a hollow cylindrical member having an inner diameter which is the same as the inner diameter of said conduit, said inner valve member being formed from said hollow cylindrical member as a longitudinal portion thereof by cutting said hollow cylindrical member along two intersecting orthogonal planes whose bisector is a plane radial to said hollow cylindrical member;

said valve seat being formed on said conduit along two intersecting orthogonal planes entering said conduit at the circumference thereof and whose bisector is a plane that includes the longitudinal axis of said conduit, the apex of said valve member created by the intersection of its orthogonal planes being cut to a curvature and said valve seat being formed with a mating curvature whereby said inner valve member may be disposed with its longitudinal axis perpendicular to the longitudinal axis of said conduit for engaging said valve seat and thereby closing off said conduit;

a tubular extension secured to said end of said conduit and forming an extension thereof, the inner diameter of said tubular extension being greater than the inner diameter of said conduit, the exterior surface of said tubular extension having seating grooves adapted to receive a quick connect coupler;

an elongated support bar extending longitudinally of said inner valve member along its outer wall and secured thereto, one end of said support bar having a transversely extending hinge pin therein, said hinge pin being disposed radially exterior to the interior wall surface of one side of said conduit and being rotatably supported from said tubular extension such that said valve member may pivot through an angle of ninety degrees between its closed position, and a fully open position in which its interior wall surface is an extension of the interior wall surface of said conduit;

a locking rod disposed on the other side of said conduit parallel to said hinge pin and rotatably supported from said tubular extension;

said locking rod having a flat surface on one longitudinal portion such that it may selectively interfere with the pivoting movement of said inner valve member between closed and open positions, or else it may permit such movement, depending upon the rotational position of said locking rod;

a spring associated with said locking rod for normally keeping it in its interfering position;

a locking lever attached to said locking rod for controlling the operation of said rod and said spring;

an outer sealing door adapted for pivoting between an open position and a closed position in which it seals said tubular extension;

door securing means connected for securing said outer door in the closed position; and means carried by said outer door at the radial center of the conduit and adapted to engage said elongated support bar when both said inner valve member and said outer door are in their closed positions, for securing the sealing action of said inner valve member.

8. A valve assembly as claimed in claim 7 which further includes an O-ring in said valve seat, and wherein said door securing means has an over-center lock portion which initially in a most fully closed position causes said outer door to seat before releasing it slightly, said elongated support bar on its other end having a cam surface which is engaged by said locking rod, said spring being responsive to the most fully closed position of said door securing means to rotate said locking rod until said cam surface of said support bar is trapped under the cylindrical portion of said locking rod and said inner valve member fully compresses said O-ring; said spring then also being operative to retain said locking rod in that rotated position after said over-center lock portion of said door securing means has passed its most fully closed position.

9. A valve assembly useful in an aircraft lavatory drain port and adpated for full opening with no obstruction of flow, comprising:
- a cylindrical conduit having an end in which a valve seat is formed;
- a valve member made from a hollow cylindrical member having an inner diameter which is the same as the inner diameter of said conduit, said inner valve member being formed from said hollow cylindrical member as a longitudinal portion thereof by cutting said hollow cylindrical member along two intersecting orthogonal planes whose bisector is a plane radial to said hollow cylindrical member;
- said valve seat being formed on said conduit along two intersecting orthogonal planes entering said conduit at the circumference thereof and whose bisector is a plane that includes the longitudinal axis of said conduit, the apex of said valve member created by the intersection of its orthogonal planes being cut to a curvature and said valve seat being formed with a mating curvature whereby said inner valve member may be disposed with its longitudinal axis perpendicular to the longitudinal axis of said conduit for engaging said valve seat and thereby closing off said conduit;
- an elongated support bar extending longitudinally of said inner valve member along its outer wall and secured thereto, one end of said support bar having a transversely extending hinge pin therein, said hinge pin being disposed radially external to the interior wall surface of one side of said conduit;
- a tubular extension secured to said one end of said conduit and forming an extension thereof, the inner diameter of said tubular extension being greater than the inner diameter of said conduit, said hinge pin being rotatably supported from said tubular extension such that said valve member may pivot through an angle of ninety degrees between its closed position, and a fully open position in which its interior wall surface is an extension of the interior wall surface of said conduit;
- locking means including a locking rod disposed on the other side of said conduit parallel to said hinge pin and external to the interior wall surface of said conduit and rotatably supported from said tubular extension, said locking rod cooperating with the other end of said support bar for selectively locking said valve member in its closed position;
- means for selectively controlling the rotation of said locking rod; and
- a seal member secured to said valve seat throughout its entire circumference.

* * * * *